US012570211B2

(12) United States Patent
Stecher et al.

(10) Patent No.: US 12,570,211 B2
(45) Date of Patent: Mar. 10, 2026

(54) METHOD FOR GENERATING AN ACOUSTIC NOTIFICATION FOR A VEHICLE

(71) Applicant: Bayerische Motoren Werke Aktiengesellschaft, Munich (DE)

(72) Inventors: Michael Stecher, Landshut (DE); Teo Babic, Munich (DE); Alexander Kielwein, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 15 days.

(21) Appl. No.: 18/705,790

(22) PCT Filed: Sep. 28, 2022

(86) PCT No.: PCT/EP2022/076903
§ 371 (c)(1),
(2) Date: Apr. 29, 2024

(87) PCT Pub. No.: WO2023/083526
PCT Pub. Date: May 19, 2023

(65) Prior Publication Data
US 2024/0424986 A1      Dec. 26, 2024

(30) Foreign Application Priority Data

Nov. 15, 2021    (DE) ..................... 10 2021 129 692.7

(51) Int. Cl.
*B60Q 9/00*          (2006.01)
*B60G 9/00*          (2006.01)
(Continued)

(52) U.S. Cl.
CPC ............... *B60G 9/00* (2013.01); *B60K 35/10* (2024.01); *B60K 35/22* (2024.01); *B60K 35/265* (2024.01); *B60K 35/80* (2024.01)

(58) Field of Classification Search
CPC .......... B60Q 9/00; B60K 35/10; B60K 35/22; B60K 35/265; B60K 35/80;
(Continued)

(56) References Cited

U.S. PATENT DOCUMENTS

| | | | |
|---|---|---|---|
| 10,841,698 B1 * | 11/2020 | Janampally | ............. G10L 25/51 |
| 2020/0175959 A1 * | 6/2020 | Cardinaux | ............. G10K 15/02 |
| 2020/0324697 A1 * | 10/2020 | Lee | ......................... B60Q 5/008 |

FOREIGN PATENT DOCUMENTS

| | | |
|---|---|---|
| DE | 102007008815 A1 | 8/2008 |
| DE | 102012216193 A1 | 5/2014 |

(Continued)

OTHER PUBLICATIONS

International Search Report corresponding to International Patent Application No. PCT/EP2022/076903, dated Jan. 31, 2023 (5 pages).

(Continued)

*Primary Examiner* — Omeed Alizada
(74) *Attorney, Agent, or Firm* — Maginot, Moore & Beck LLP

(57)          ABSTRACT

A method for outputting an acoustic signal in a vehicle is disclosed herein. The method includes capturing a current status of a first component of the vehicle, and checking whether the current status differs from a corresponding previous status of the first component. Thereafter, the method further includes generating a continuous acoustic signal representing the captured status, and outputting the continuous acoustic signal as a notification of the captured status in the vehicle.

20 Claims, 2 Drawing Sheets

(51) Int. Cl.
  *B60K 35/10*     (2024.01)
  *B60K 35/22*     (2024.01)
  *B60K 35/26*     (2024.01)
  *B60K 35/80*     (2024.01)
(58) Field of Classification Search
  CPC .. B60K 2360/178; B60K 35/28; B60K 35/26;
                                                     G06F 3/167
  See application file for complete search history.

(56)                        References Cited

FOREIGN PATENT DOCUMENTS

| DE | 102017007472 A1 | 4/2018 |
| DE | 102017206876 A1 | 10/2018 |
| DE | 102019111913 A1 | 11/2020 |
| WO | 2019012017 A1 | 1/2019 |

OTHER PUBLICATIONS

Written Opinion corresponding to International Patent Application
No. PCT/EP2022/076903, dated Jan. 31, 2023 (9 pages).
German Search Report corresponding to German Patent Application
No. 10 2021 129 692.7, dated Jul. 28, 2022. (7 pages).

\* cited by examiner

METHOD FOR GENERATING AN ACOUSTIC NOTIFICATION FOR A VEHICLE

CROSS-REFERENCE TO RELATED APPLICATIONS

The present application is the U.S. national phase of PCT Application PCT/EP2022/076903 filed on Sep. 28, 2022, which claims priority of German patent application No. 10 2021 129 692.7 filed on Nov. 15, 2021, the entire disclosure of which is incorporated herein by reference in its entirety.

FIELD

The present disclosure relates to a method for generating an acoustic notification in or on a vehicle, a control device for performing the method, a vehicle with such a control device and a computer program for performing the method.

BACKGROUND

When using voice recognition systems in vehicles, it may happen that during voice input, the driver may be distracted by events in traffic from the process of voice input. Depending on the intensity and duration of the distraction, it is possible that the driver does not remember a previous sound signal of the voice recognition system. As a result, for example, the voice input expected by the vehicle control system can be omitted. In addition, sound signals are not a particularly intuitive way to detect statuses of the voice recognition system. Visual representations of the status of the voice recognition system require the driver to take their eyes off the road. This is fraught with dangers.

In view of the foregoing, it would be advantageous to improve the possibilities for displaying statuses of a voice recognition system in a vehicle.

SUMMARY

A first aspect of the present disclosure relates to a method for the output of an acoustic notification in or on a vehicle, wherein the method includes:

capturing a current status of a first component of the vehicle;
   checking whether the current status differs from a corresponding previous status of the first component;
   generating a continuous acoustic signal that represents the captured status;
   outputting the continuous acoustic signal in or on a vehicle as a notification of the captured status.

In particular, a "first component of the vehicle" within the meaning of the disclosure is to be understood as a voice recognition system.

A "status" of a voice recognition system within the meaning of the disclosure is to be understood in particular as the statuses listed below by way of example, but not exhaustively. For example, the status of the start-up of speech capture is referred to as "Appearing". This is the start-up of the computer system and/or the speech capture program, which is caused by pressing a button, touching a touch control, or voice input such as 'BMW'. After this "Appearing", i.e. booting up, the speech capture goes into a status called "Listening". In this status of "Listening", voice input is expected from the speech capture. After that, in the "Speech detection" status, voice inputs are acquired from the speech capture. When speech capture then processes the captured voice input, the status is "Thinking". If the system itself outputs speech, the status is "Speaking". If there is no speech input or speech output for a long time, the system goes into a snoozing status called "Snoozing". When shutting down speech capture, the status is finally "Disappearing".

The term "capturing a current status" refers in particular to the electronic capture of a setting and/or an electronic measurement.

A "continuous acoustic signal" within the meaning of the disclosure is a signal which essentially occurs as long as the acoustic signal is assigned to the captured status, as opposed to so-called sound signals, which consist of ready-made WAV or mp3 files and are only of short duration. In particular, the continuously emitted acoustic signals are so-called ambient sounds. Ambient sounds change with time. Such acoustic signals, i.e. ambient sounds, are not ready-made files. Ambient sounds are generated by characteristically a synthesizer. Ambient sounds are originally used to create an ambience mood. So far, they have not been used to transport specific information. They are usually only used for scene-setting and can be colloquially referred to as "background music", "soundscape" or "sound tapestry".

In some embodiments, the method includes capturing a first noise level in order to influence the acoustic signal based on the result of capturing the first noise level.

The term "capturing a first noise level" within the meaning of the disclosure is to be understood here as meaning that the sum of the currently available acoustic signals in or on the vehicle is captured. This capturing includes, in particular, the sounds captured with a microphone as they occur in or on the vehicle. These are, in particular, driving noises such as a possible engine noise, tire rolling noise and wind noise. Breathing sounds of the vehicle occupants are also captured with the microphone. In this step, it is also possible to capture sounds electronically if they are generated with electronic devices. This can be the output of the entertainment system (for example radio), the electronically generated driving noise of an electrically powered vehicle, or the ambient sound created by means of a synthesizer. Noises affecting the vehicle from the outside, which are captured by a microphone mounted on the outside of the vehicle or detected by the microphone in the interior of the vehicle, also contribute to the first noise level. An example of sound affecting the vehicle from the outside is the sound of other vehicles.

The continuous acoustic signals generated according to the disclosure can signal the aforementioned statuses of speech capture by of means suitable individually generated sounds. Since the output of these signals is continuous, i.e. as long as the respective status of speech capture pertains, a speaker's attention is refocused on speech capture once the intensity of a distraction (for example caused by the current traffic situation) has decreased to such an extent that the driver can return to the speech capture. Furthermore, these acoustic signals can also indicate which component should currently be operated by means of speech capture. For example, it is possible that the acoustic signal is used to signal the operation of a fan or ventilator by means of a continuously emitted wind noise.

In some embodiments, the method includes the adjustment of a second noise level to produce a harmonious sound image.

It is particularly advantageous if the acoustic signal generated to describe the status of voice recognition is adjusted to the first captured noise level. The acoustic signal is added to the first noise level. This will change the first noise level. In the adjusting step the individual signals, i.e. the acoustic signal for describing the status of voice recognition, the output of the entertainment system, a possible electronically generated driving sound and the other acoustic signals captured in the first noise level are weighted against each other. The volume of the output of the entertainment system and the output of the driving noise are reduced for example. In this adjusting step, the outputs of the electronically generated sounds are then changed, for example in pitch and volume, so that the acoustic output results in a harmonious sound image. The changed first noise level becomes the second noise level due to the added acoustic signal.

In some embodiments, the method includes the capture of a driver's status in order to influence the acoustic signal by means of the result of the capture of the driver's status.

Stress levels, tiredness and emotions of the driver, i.e. the speaker, can be advantageously taken into account when assigning the acoustic signal by capturing signals such as duration and frequency of blinking, respiratory rate and similar physiological signals by means of the camera and the microphone. With the result of this capture, the acoustic signal can be better adapted to the driver's status based on, for example, volume, pitch, etc.

In some embodiments, the method involves capturing environmental conditions in order to influence the acoustic signal by means of the result of capturing environmental conditions.

"Environmental conditions" within the meaning of the disclosure are, for example, the respective location, in particular the country in which the vehicle is located, the time, the season, the number of occupants of the vehicle, the current traffic situation, the current weather and/or the destination of the navigation. The term "location" also includes the respective road on which the vehicle is located. Often, there are speed limits of for example 20 or 30 km/h in built-up areas in purely residential areas. The above list is not to be understood as exhaustive.

The capture of environmental conditions makes it possible to better adapt the acoustic signal for indicating the status of the voice recognition system to the actual existing conditions. The acoustic signal for indicating the status of the voice recognition system can be output, for example, at a lower volume in the aforementioned residential areas with a speed limit of 30 km/h than on a motorway. The wind noise is louder there at the usual speeds. Therefore, on a motorway, a higher volume of the acoustic signal may be used to indicate the status of the voice recognition system than can be used in a residential area.

In some embodiments, generating a continuous acoustic signal involves assigning a value for volume, pitch, and/or speech output.

Advantageously, values for the specified quantities can be assigned when generating the acoustic signal for indicating the status of the speech capture system. In this way, the continuous acoustic signal can be adapted more precisely to the situation at hand.

In some embodiments, generating a continuous acoustic signal involves assigning a time-varying value for volume, pitch, and/or speech output to the continuous acoustic signal.

Further benefits can be achieved by changing the assigned value over time, for example for the volume. Due to a slow increase in volume during "Appearing" of the voice recognition system, excessive distraction or even frightening of the driver can be avoided. Usually, the acoustic signal for indicating the status of the speech capture system is quieter in the "Listening" status than in the previous status. A reduction of the volume over time serves a smooth transition. In this way, the driver is offered the opportunity of a certain amount of time to prepare for performing voice input without at the same time creating an excessive distraction from the actual driving tasks.

A second aspect concerns a controller of a vehicle which is set up to perform a method according to the first aspect or one of the embodiments thereof. Controllers are commonly used in vehicles. Controllers (which may also be referred to herein as "control units," "control devices," "processors" or "microprocessors") include circuits (e.g., integrated circuits) that contain typical functionality of central processing units (CPU) and are configured to perform various calculations and analysis based on manufacturer programming. Examples of controllers used in vehicles include any of various Engine Control Units (ECNs) commonly used by different manufacturers in modern automobiles.

In some embodiments of the second aspect, the control device has a synthesizer.

A third aspect concerns a vehicle with a control device which is set up to perform a method according to the first aspect or one of the embodiments thereof.

A fourth aspect concerns a computer program containing commands which cause a control device according to the second aspect or one of the embodiments thereof to perform a method according to the first aspect or one of the embodiments thereof.

The terms 'comprises', 'includes', contains, 'has', 'with' or any other variant thereof which may be used herein are intended to cover non-exclusive inclusion. For example, a process or apparatus that contains or has a list of elements is not necessarily limited to those elements, but may include other elements which are not expressly listed or which are inherent in such a process or device.

Further, unless expressly stated otherwise, "or" refers to an inclusive or and not an exclusive "or". As an example, a condition A or B is satisfied by one of the following statuses: A is true (or present) and B is false (or absent), A is false (or absent) and B is true (or present), and both A and B are true (or present).

The terms "a" or "an" as used herein are to be used within the meaning of "one or more".

The term "configured" or "set up" to perform a particular function (and variations thereof) is to be understood within the meaning of the disclosure that the corresponding apparatus already exists in a design or setting in which it can perform the function or at least can be set up—i.e. is configurable—to perform the function after the appropriate setting up. The configuration be carried out, for example, by suitably setting parameters of a process sequence or switches or similar to activate or deactivate functionalities or settings. In particular, the apparatus may contain multiple predetermined configurations or operating modes, so that configuration can be carried out by selecting one of these configurations or operating modes.

The features and advantages explained in relation to the first aspect of the disclosure apply correspondingly to the other aspects of the disclosure. Further advantages, features and applications of the present disclosure are to be found in the following detailed description in connection with the figures.

DESCRIPTION

Figure 1:
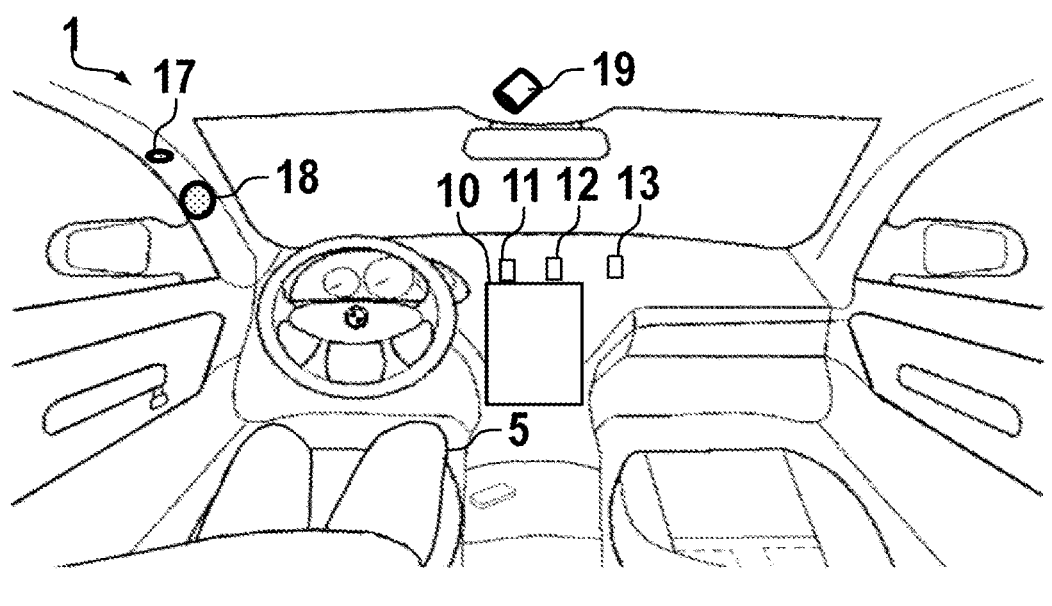
FIG. 1 shows an interior of a vehicle equipped according to the present disclosure.

FIG. 1 shows an interior of a vehicle 1 equipped according to the present disclosure. The driver 5 receives information from the display of the control device 10. Sounds and voice inputs from the driver are captured by the microphone 17 in the interior of the vehicle 1. Another microphone that is not shown can pick up sounds from the vehicle's surroundings. Such microphones for picking up ambient noise are usually mounted on the outside of the vehicle. The control device 10 issues instructions of the navigation system, entertainment system sound and speech output to the driver 5 and/or other occupants via the loudspeaker 18. A synthesizer 11 produces ambient sounds and other sounds. Electronically generated sounds are adjusted in a harmonizer 12 in such a way that, in conjunction with the first noise level, a harmonious sound is created in the interior of the vehicle. The synthesizer 11, harmonizer 12 and voice recognition 13 are shown here with dotted lines because these components cannot normally be perceived from the interior of the vehicle because they are hidden behind the dashboard. The synthesizer 11 and harmonizer 12 can also be integrated into the control device 10. A camera 19 is used to monitor the driver 5 from a safety point of view.

Figure 2:
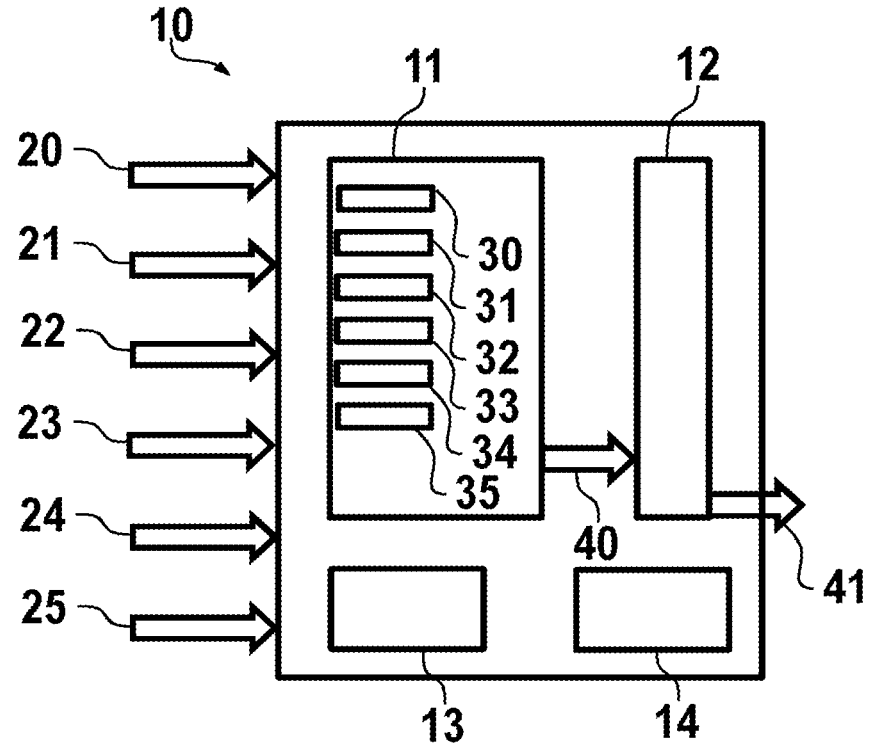
FIG. 2 shows a block diagram of a control device.

FIG. 2 is a block diagram of a control device; part of control device 10 is shown in which the synthesizer 11 and the harmonizer 12 are integrated. As input parameters, the control device 10 uses the status 20 of voice recognition, the environmental conditions 21, the driver's status 22, the status 23 of other components, a user profile 24 adapted to the respective driver 5 and the noise level 25. The control device can transmit these input parameters to both the synthesizer 11 and the harmonizer 12. Inside the synthesizer 11, the parameters of the acoustic signal are set which are used to inform the user about the status of the voice recognition. These parameters are the volume 30, the pitch 31, the relative intensity 32 of individual frequency ranges, as can be adjusted with a so-called equalizer, the speech output 33, sound effects 34 and parameters 35 for direction and spatiality. The synthesizer 11 transmits the acoustic signal with the set parameters 30 to 35 to the harmonizer 12, which is represented by the arrow 40. The harmonizer 12 outputs the acoustic signal as well as other electronically generated signals to the loudspeaker(s) as represented by the arrow 41. The voice recognition system 13 and the entertainment system 14 are also integrated into the control device 10.

Figure 3:
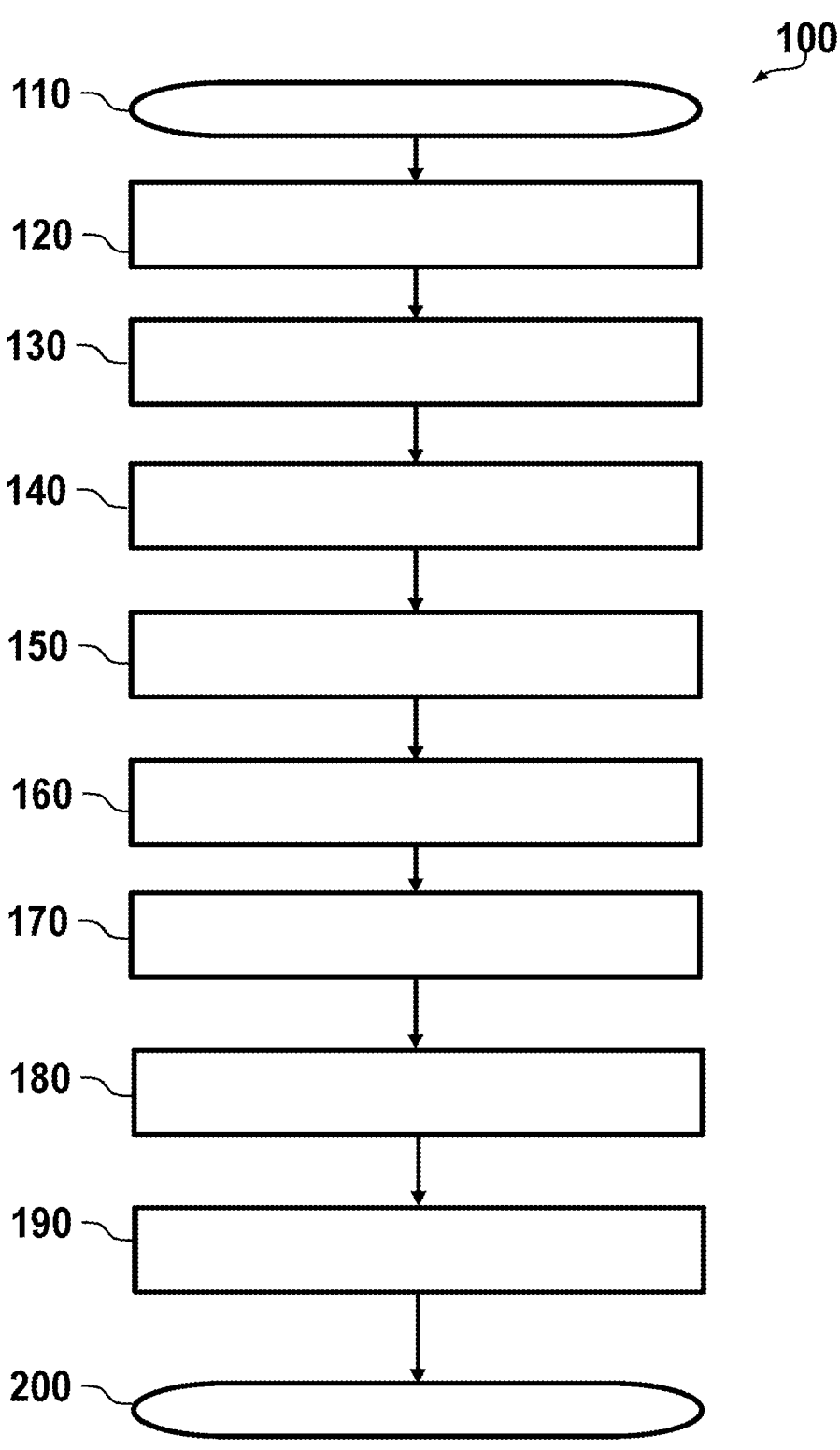
FIG. 3 is a flowchart showing the method according to the first aspect.

The method 100 shown in FIG. 3 begins in step 110. Step 120 is used to capture the status of a first component of the vehicle, namely speech capture. In step 130, a check is carried out for a change in the status since the last capture. Step 140 involves capturing a noise level. Here, current acoustic signals inside the vehicle are captured.

This capturing includes, in particular, noises picked up by a microphone as they occur inside the vehicle. In this step, it is also possible to capture sounds that are generated electronically. This can be the acoustic output of the entertainment system (for example radio) or the electronically generated driving noise of an electrically powered vehicle. Noises affecting the vehicle from the outside, which are captured by a microphone mounted on the outside of the vehicle or are detected by the microphone in the interior of the vehicle, also contribute to the first noise level. Examples of noises affecting the vehicle from the outside are, for example, wind noise and/or noise from other vehicles.

In step 150, a continuous acoustic signal 40 is generated, which represents the captured status 20. In contrast to so-called sound images, which consist of ready-made WAV short duration, the or mp3 files and are only of continuously emitted acoustic signals are so-called ambient sounds, which are variable over time. They are generated by a synthesizer. In step 160, the driver's status is captured. Stress level, tiredness and emotions of the driver, i.e. the speaker, can be advantageously taken into account when assigning the acoustic signal by capturing signals such as duration and frequency of blinking, respiratory frequency and similar physiological signals by means of the camera and microphone. With the result of this capturing, the acoustic signal can then be better adapted to the driver's status, for example in terms of volume and/or pitch.

The environmental conditions are captured in step 170. These include, for example, the respective location, in particular the country in which the vehicle is located, the time, the season, the number of occupants of the vehicle, the current traffic situation, the current weather and/or the destination of the navigation. The location also includes the respective road on which the vehicle is located. In built-up areas, there are often speed limits of, for example, 20 or 30 km/h. The above list is not to be understood as exhaustive. By taking into account the environmental conditions mentioned above by way of example, an improvement in the output of the continuous acoustic signal 40 is achieved.

In step 180 all electronically generated noises are adjusted and output through the loudspeaker, so that the important acoustic signals can be clearly perceived against the other acoustic signals and the ambient noises. In step 190, the output of the electronically generated noises produced by the loudspeaker is performed. The method ends in step 200. The acoustic signal is output continuously to inform the user about the status of voice recognition.

An abbreviated representation of the disclosure is that a specially generated noise is created with the generator (synthesizer) for the ambient sound as a notification during the entire interaction with the voice assistant. The interaction can be initiated by the user proactively by the voice assistant. By modulating the ambient sound depending on various input parameters, various information relating to the voice recognition system can be displayed, such as the status of the recognizer ("appearing", "listening", "speech detection", "thinking", "speaking", "snoozing" and "disappearing") or the result of speech processing. The modulation of the continuous acoustic signal generated specifically as a notification can be carried out, for example, by means of the volume, pitch, key, additional sound effects, etc.

If the driver activates voice control by pressing the push-to-talk button or by means of a voice input such as "BMW", the continuous acoustic signal generated specifically as a notification also begins to play. The continuous acoustic signal that is generated specifically as a notification signals to the driver that the voice assistant has been activated. Immediately after activation, the volume of the sound is reduced to a minimum, which means to the user that he can now speak. Thus, the level of the volume changes over time. Once the driver or another user has completed their voice input, the volume increases. An altered sound indicates that the system has received the voice input and is starting to process it. During the processing, the output of the respective sound is altered in terms of pitch and sound characteristics, from which the user knows that the system is working and that he currently has to wait. When a certain sound is emitted, the user knows that the system is working as long as this sound can be heard. That would not be the case with a sound sign, because there is silence after the sound sign has been played. As a result, the driver may have been provoked into taking a look at the display for example. This would be an undesirable distraction from the actual task of driving the vehicle. After processing the voice input, the voice assistant responds with a voice output. At the same time, the sound is manipulated again, for example by changing its sound characteristics. If the voice system requires further input from the user, the sound would be manipulated again, in this case by reducing its volume again in order to give the user "acoustic space" for their voice inputs. As long as the sound can be heard at a low volume level, the user knows that he can now speak. If the input was successful at the end of the use case, the sound can be manipulated again, in this case by adjusting the pitch again in such a way that a positive sound is obtained, for example. On the other hand, unsuccessful On the other hand, unsuccessful inputs could produce a negative sound. Another example concerns proactive use cases in which the voice dialog is initiated by the voice assistant. In this case, the continuous acoustic signal generated specifically as a notification at the beginning of the use case is used to announce a voice output of the voice assistant and not to start directly with the voice output. The advantage of this is that a gentle increase in the volume of the sound does not frighten the driver, but he can prepare himself for the fact that a speech output can be performed shortly.

In an example, the voice dialog sound is generated in a synthesizer, which is responsible for generating all sounds used in the vehicle. For example, the synthesizer can also be used to generate the driving noise of an electric car, among other sounds. Depending on external parameters such as speed, acceleration, accelerator pedal position, etc., this sound is produced and the parameters displayed (volume, pitch, sound effects, etc.) are manipulated. If the user starts a voice dialog during this time, this is taken into account in the synthesizer by suitably manipulating the parameters (volume, pitch, sound effects, . . . ) depending on other relevant input parameters (especially the recognition status of the voice recognition system) and the sound output is changed accordingly. It also is possible change to the consideration or weighting of the input parameters. In a specific context, ultimately, the following behavior can manifest itself: the driver drives an electric car and listens to the driving sound generated by the synthesizer, which is emitted by means of the loudspeakers in the vehicle interior. The volume of the driving sound varies depending on the speed. The user then starts a voice dialog, whereupon the recognition status, among other things, is added as a further input parameter. The sound produced by the synthesizer changes accordingly by adapting the tone of by the sound (for example intensifying certain frequencies) to signal the beginning of the voice dialogue. In addition, the manipulation of the volume is now only carried out depending on the recognition status, but no longer depending on the speed.

REFERENCE SIGN LIST

1 Vehicle
5 Driver
10 Control device with display
11 Synthesizer
12 Harmonizer
13 Voice recognition system
14 Entertainment system

8

17 Microphone
18 Loudspeaker
19 Camera
20 Voice recognition status parameter
21 Environmental conditions parameter
22 Driver's status parameter
23 Additional component(s) status parameter
24 User profile parameter
25 Noise level parameter
30 Volume parameter
31 Pitch parameter
32 Intensity of individual frequency ranges parameter
33 Speech output parameter
34 Sound effect parameter
35 Direction and spatiality parameter
40 Output from synthesizer to harmonizer
41 Output to loudspeaker
100 Method
110 Start method
120 Detecting the status of voice recognition
130 Check for change in status
140 Detecting a noise Level
150 Generating a continuous acoustic signal
160 Detecting a driver's status
170 Detecting environmental conditions
180 Adjusting the continuous acoustic signal
190 Outputting the continuous acoustic signal
200 End of method

The invention claimed is:

1. A method for outputting an acoustic signal in a vehicle wherein the method includes:
   capturing a current status of a first component configured to perform voice recognition of the vehicle;
   checking whether the current status differs from a corresponding previous status of the first component;
   generating a continuous acoustic signal representing the captured status; and
   outputting the continuous acoustic signal as a notification of the captured status in the vehicle.

2. The method as claimed in claim 1, which further includes:
   capturing a first noise level in order to influence the acoustic signal on the basis of a result of the capture of the first noise level.

3. The method as claimed in claim 1, which further includes:
   adjusting a second noise level in order to produce a harmonious sound image.

4. The method as claimed in claim 1, which further includes:
   capturing a driver's status in order to influence the acoustic signal by means of a result of the recording of the driver's status.

5. The method as claimed in claim 1, which further includes capturing environmental conditions in order to influence the acoustic signal by means of a result of capturing the environmental conditions.

6. A method for outputting an acoustic signal in a vehicle wherein the method includes:
   capturing a current status of a first component of the vehicle;
   checking whether the current status differs from a corresponding previous status of the first component;
   generating a continuous acoustic signal representing the captured status; and outputting the continuous acoustic signal as a notification of the captured status in the vehicle generating the continuous acoustic signal includes assigning at least one of a time-varying value for volume, pitch, and speech output to the continuous acoustic signal.

7. The method as claimed in claim 1 wherein generating a continuous acoustic signal comprises generating ambient sounds via a synthesizer.

8. A control device of a vehicle, the control device configured to:

capture a current status of a first component configured to perform voice recognition of the vehicle;

check whether the current status differs from a corresponding previous status of the first component;

generate a continuous acoustic signal representing the captured status; and output the continuous acoustic signal as a notification of the captured status in the vehicle.

9. The control device as claimed in claim 8, wherein the control device is further configured to:

capture a first noise level in order to influence the acoustic signal on the basis of a result of the capture of the first noise level.

10. The control device as claimed in claim 8, wherein the control device is further configured to:

adjust a second noise level in order to produce a harmonious sound image.

11. The control device as claimed in claim 8, wherein the control device is further configured to:

capture a driver's status in order to influence the acoustic signal by means of a result of the recording of the driver's status.

12. The control device as claimed in claim 8, wherein the control device is further configured to capture environmental conditions in order to influence the acoustic signal by means of a result of capturing the environmental conditions.

13. The control device as claimed in claim 8, wherein:

the control device is further configured to generate a continuous acoustic signal involves assigning a value for at least one of volume, pitch, and speech output to the continuous acoustic signal.

14. The control device as claimed in claim 8, wherein:

the control device is further configured to generate a continuous acoustic signal including assigning at least one of a time-varying value for volume, pitch, and speech output to the continuous acoustic signal.

15. A non-transitory computer-readable medium using a controller of a vehicle to output an acoustic signal, wherein the computer-readable medium comprises instructions which, when executed by the controller, cause the controller to perform the method of claim 1.

16. The non-transitory computer-readable medium as claimed in claim 15, further comprising instructions which, when executed by the controller, cause the controller to:

capture a first noise level in order to influence the acoustic signal on the basis of a result of the capture of the first noise level.

17. The non-transitory computer-readable medium as claimed in claim 15, further comprising instructions which, when executed by the controller, cause the controller to:

adjust a second noise level in order to produce a harmonious sound image.

18. The method as claimed in claim 1, wherein each of the current status and the corresponding previous status is a distinct corresponding status of a speech capture program of the first component.

19. The method of claim 18, wherein the current status is selected from one of the following:

an appearing status of the speech capture program;

a listening status of the speech capture program;

a speech detection status of the speech capture program;

a thinking status of the speech capture program that processes captured voice input; and a speaking status of the speech capture program.

20. The method of claim 19, wherein the corresponding previous status is selected from one of the following:

an appearing status of the speech capture program;

a listening status of the speech capture program;

a speech detection status of the speech capture program;

a thinking status of the speech capture program that processes captured voice input; and a speaking status of the speech capture program.

\*     \*     \*     \*     \*